(12) United States Patent
Probert, Jr. et al.

(10) Patent No.: US 6,745,176 B2
(45) Date of Patent: Jun. 1, 2004

(54) DYNAMIC INFORMATION FORMAT CONVERSION

(75) Inventors: David Bradley Probert, Jr., Woodinville, WA (US); Chao-Chia Liu, Bellevue, WA (US)

(73) Assignee: Microsoft Corporation, Redmond, WA (US)

( * ) Notice: Subject to any disclaimer, the term of this patent is extended or adjusted under 35 U.S.C. 154(b) by 0 days.

(21) Appl. No.: 10/371,492

(22) Filed: Feb. 21, 2003

(65) Prior Publication Data

US 2003/0130999 A1 Jul. 10, 2003

Related U.S. Application Data

(62) Division of application No. 09/157,698, filed on Sep. 21, 1998, now Pat. No. 6,549,918.

(51) Int. Cl.[7] .............................................. G06F 17/30
(52) U.S. Cl. ............................ 707/2; 707/10; 707/203; 709/223; 709/230
(58) Field of Search ............................ 709/230, 225; 707/100, 204, 10, 2, 203; 380/277

(56) References Cited

U.S. PATENT DOCUMENTS

| 5,506,983 | A | | 4/1996 | Atkinson et al. ........... 395/600 |
|---|---|---|---|---|
| 5,675,789 | A | * | 10/1997 | Ishii et al. .................. 707/204 |
| 5,706,504 | A | | 1/1998 | Atkinson et al. ........... 395/611 |
| 5,715,441 | A | | 2/1998 | Atkinson et al. ........... 395/601 |
| 5,878,422 | A | * | 3/1999 | Roth et al. .................. 707/100 |
| 2002/0120763 | A1 | * | 8/2002 | Miloushev et al. ......... 709/230 |
| 2003/0086570 | A1 | * | 5/2003 | Riedel et al. ............... 380/277 |

* cited by examiner

*Primary Examiner*—Charles Rones
(74) *Attorney, Agent, or Firm*—Merchant & Gould P.C.

(57) ABSTRACT

A software layer (filter driver) residing between software components or application programs running locally or on a client across a network and a persistent store of an operating system provides on-the-fly conversions of persistent information formats. The filter driver determines which format a program expects, and dynamically converts the information from its storage format to the format expected by the program. Conversion includes both data format conversion, and conversion of access semantics. Loadable conversion modules are provided for converting application specific formats due to the potential large number of such formats which can be encountered. The filter driver may change the format that information is stored in based on access history or other system requirements. The software components or application programs may be ignorant of the true storage format used by the system, and thus the filter driver can be used to transparently give old versions of software access to information stored in newer formats.

8 Claims, 5 Drawing Sheets

DYNAMIC INFORMATION FORMAT CONVERSION

This application is a divisional of application Ser. No. 09/157,698, filed Sep. 21, 1998 now U.S. Pat. No. 6,549,918, which application(s) are incorporated herein by reference.

FIELD OF THE INVENTION

This invention relates generally to the field of processing computer information formats and more particularly to a method and system for dynamically accessing information in a format different than the format used by the computer system to internally represent the information.

COPYRIGHT NOTICE/PERMISSION

A portion of the disclosure of this patent document contains material which is subject to copyright protection. The copyright owner has no objection to the facsimile reproduction by anyone of the patent document or the patent disclosure as it appears in the Patent and Trademark Office patent file or records, but otherwise reserves all copyright rights whatsoever. The following notice applies to the software and data as described below and in the drawing hereto: Copyright© 1998, Microsoft Corporation, All Rights Reserved.

BACKGROUND

Computer applications such as document processors, data base programs, simulators, games, editors, and compilers all need to persist information even while the application is not running. Computer systems store persistent information in a variety of ways, including disk-based file systems, data bases, hierarchical storage systems, internet servers, and distributed memory. Persistent application data is stored in different formats depending on the type of application, and even depending on the version of a single application. The format of the information is what gives meaning to the binary bits which are used to represent the information. The format includes both the explicit details of how to interpret the bits, as well as the rules that are to be observed when accessing the information such as how to concurrently access the data from multiple user, how to sequence modifications to the information so that it can be recovered after a system crash, or how to maintain auxiliary data used to manage the information for purposes such as workflow management, auditing, or security. Multiple formats can be applied to the same information. The persistent storage that holds the information produced by an application is sometimes referred to as a file. The computers on which such applications run have file systems and other persistent stores which store the files out onto memory devices in yet further formats. These multiple different formats, both at the application level and at the file server level lead to difficult interoperability problems. For example, a document produced by a later version of a document processor is often not readable by a previous version of the document processor. When a user buys a new computer loaded with the latest software, produces a document, and gives a copy of the document to someone else only having a previous version of the software, the copy can be useless and indecipherable by the previous version.

Further difficulties arise when a user desires to share documents and other files over a network with a person using a different operating system, or application, or even a different version of the same operating system or application. If the different systems use different formats for the information, due to changes in the applications, or internal operating system components, they may have difficulty sharing information. In particular the newer system or application may use an information format that was invented after the earlier system was developed. These difficulties also arise with different applications that use a common type of information, but expect different formats, such as image processing applications that use JPEG instead of GIF, or document processors which use HTML instead of Word7 format. Incompatibilities can also be due to the file systems or other persistent stores used by different operating systems. One type of operating system has file servers that store data files formatted as a single stream. Applications interface with the file server via an interface, such as OLE32, and expected the data to be returned to it in a certain format. OLE32 was specifically designed to retrieve and transfer data in the single stream format of docfiles. A newer or different type of file format may use the same set of interfaces, but store the information in a different format, perhaps relying on a file system format that supports multiple streams in a single storage container, and this results in a compatibility problem.

Prior attempts to solve the problem of using different versions of applications and different applications storing data in different formats involved the use of conversion programs which performed explicit conversions on information between formats. Thus, when opening a document, a user would be presented with a choice of converting a document to a new format prior to opening it. Also, on storing out a document, a user may select many different application level formats in which to store it. These solutions worked well for new versions of software, where the support for such conversions was built into the programs, but did not work well when an older version of software was confronted with a data format produced by a newer version. If a user of the new version failed to explicitly save the information in a format that was understood by earlier systems, the information would be unavailable to users on earlier systems. Either the earlier system must be upgraded with a new program to convert the data, or the newer program must be started again and the file converted prior to trying to use the older version to work with it. This was an unsatisfactory solution because the older application or system would not understand that the information was in a newer format, and give the user confusing error messages. Even where the format problem could be detected, there were generally no tools available on the older system to effect the conversion. The problem is also common on computers coupled by network, where a file server, remote database or other distributed persistent storage mechanism may store data in a newer file system format, or there may be multiple versions of the same software on different machines, and one user does not have access to newer versions in order to appropriately transform application information formats.

Some image processing applications keep an image file in an internal compressed format, and then use an operating system driver to transform the file to appear to be in a fixed set of well-know image formats (JPEG, GIF, etc). It does not allow modifications to the well-known formats, and is only involved in data format conversion.

Such solutions also fail to provide more than data format conversion. The 'how to' rules associated a with the format are not implemented, so users cannot share or manage the information. This type of format conversion produces a copy of the information in the old format, which can be accessed or modified independently of the original producing inconsistencies between the separately stored versions of the information.

There is a need for an easier and more convenient way to provide interoperability between different versions of applications and operating system persistent storage systems. There is a need for such a way which does not require modifications to the applications, and that is backward compatible with existing applications. The provision of such interoperability should be transparent to a user and should also be provided in an efficient manner. Further, it should allow persistent application information to be dynamically shared and managed according to the rules of the newer format, rather than requiring users of older software to only make a copy of the information in an older format.

SUMMARY OF THE INVENTION

An operating system layer resides between software components or application programs that expect information to be in one format and a persistent store manager of the operating system which maintains the information in its persistent form. The operating system layer, which is referred to as a filter driver, provides on-the-fly conversion between the file format expected by the application layer and the format used by the persistent store manager. The filter driver determines which format a program expects, and dynamically converts the information to such a format, including both the static layout of the binary data as well as the dynamic rules for how to access the data.

Computer programs access persistent information by invoking Application Programming Interfaces (APIs) which make copies of the information in the persistent store available in the program's memory, and also update the persistent store with any desired changes. In addition to the static binary data portion of the information, there is auxiliary information regarding aspects such as dates, security, amount of information available, and other properties. This auxiliary information is sometimes called 'meta-data.' The filter driver dynamically converts between formats by copying information between the persistent store and the application's memory according to a conversion algorithm, providing the application with a 'view' of the file that is different from the view offered by the underlying storage system. The 'converted view' provided by the filter driver does not necessarily mean that all the data and meta-data of the file has been converted. The requirement is only that the data that is copied into the application's memory appears to have been converted.

Both file system formats and application program specific formats are convertible by the filter driver. This allows applications and other programs to operate transparently with different file systems and older versions of applications without modification. In one instance of the invention, separate loadable conversion modules are provided for converting application specific formats due to the potential large number of such formats which can be encountered.

Loadable conversion modules are provided as either parts of the operating system or as parts of distinct applications. For example two versions of a word processor application might run on the same system, with the newer one storing documents in a different format. The newer version of the application could provide a conversion module for use by the filter driver to allow files created by the new application to be accessed by the old application.

The filter driver may reside in the kernel of an operating system of a computer system. Applications may be operating directly on the computer system, or may be networked to the computer system. In either event, the filter driver sits above a persistent store, such as a file system and intercepts requests for stored information coming from either the local Application Programming Interfaces (APIs) or across the network. An indication that an application requires a data format transformation is provided to the filter driver by either the application specifying the desired format, or it is deduced from information such as the version of the system or application opening the file. If no indication of the desired format is provided, an older version of the application is assumed which requires the information to be in an older, well-known format. The stored form of the information may be converted to an intermediate format which is maintained by the filter driver to handle semantic differences. The intermediate format may include cached information in order to improve performance and avoid having to convert files with each access. The filter driver may also keep a file in different formats depending on access history or other system requirements.

Statistics are kept on the manner in which the information containers are accessed. The statistics are used to estimate the overall cost of dynamic conversion from the various alternatives for the actual storage format. If it is estimated that the overall costs, measured in cpu cycles, memory requirements, on-disk storage size, and similar resource metrics, will be less if a new stored format is used, the stored form of the information can be translated to a new format using otherwise idle system resources, such as during night or weekend hours.

The filter driver allows applications to open files in the formats that they expect even though the underlying file system and data format may be different. If the file's true format and expected format are compatible, the filter driver allows the open to succeed directly, bypassing the filter driver. If the formats are incompatible, then when the application reads and writes the file, the filter driver causes the file to appear in the expected format. Semantic information regarding concurrent access between applications is also translated. Auxiliary information having implied semantics such as access control lists, management information, property sets, alternate representations, cached information, annotations, audit trails and other similar information is also maintained and may be cached for faster access.

One benefit of the current invention is that parts of a system may be updated to work with a new file system or new versions of software without having to ensure that the entire system is converted at the same time. This makes upgrades easier to perform, and also allows upgrades to take place in stages, which can be very important for organizations with large numbers of systems. Applications can also embed files in a new context, such as in emails or copying to an offline media, where specific formats are required. Since the filter driver resides in or near the kernel, overhead of the conversions are low, and conversion is transparent to the applications. Further, when converting back to an older format the filter driver can choose a more efficient representation of the information in the older format based on information in the newer format, such as in WindowsNT 5.0 where NSS to docfile conversion results in contiguous file allocation tables.

DETAILED DESCRIPTION

In the following detailed description of exemplary embodiments of the invention, reference is made to the accompanying drawings which form a part hereof, and in which is shown by way of illustration specific exemplary embodiments in which the invention may be practiced. These embodiments are described in sufficient detail to enable those skilled in the art to practice the invention, and it is to be understood that other embodiments may be utilized and that logical, mechanical, electrical and other changes may be made without departing from the spirit or scope of the present invention. The following detailed description is, therefore, not to be taken in a limiting sense, and the scope of the present invention is defined only by the appended claims.

The detailed description is divided into multiple sections. In the first section, the hardware and the operating environment in conjunction with which embodiments of the invention may be practiced are described. In the second section, the environment and operation of a filter driver for converting between selected formats is discussed. In the third section, different additional functions relating to the filter driver are discussed, followed by a conclusion which states some of the potential benefits and describes further alternative embodiments.

Hardware and Operating Environment

Figure 1:
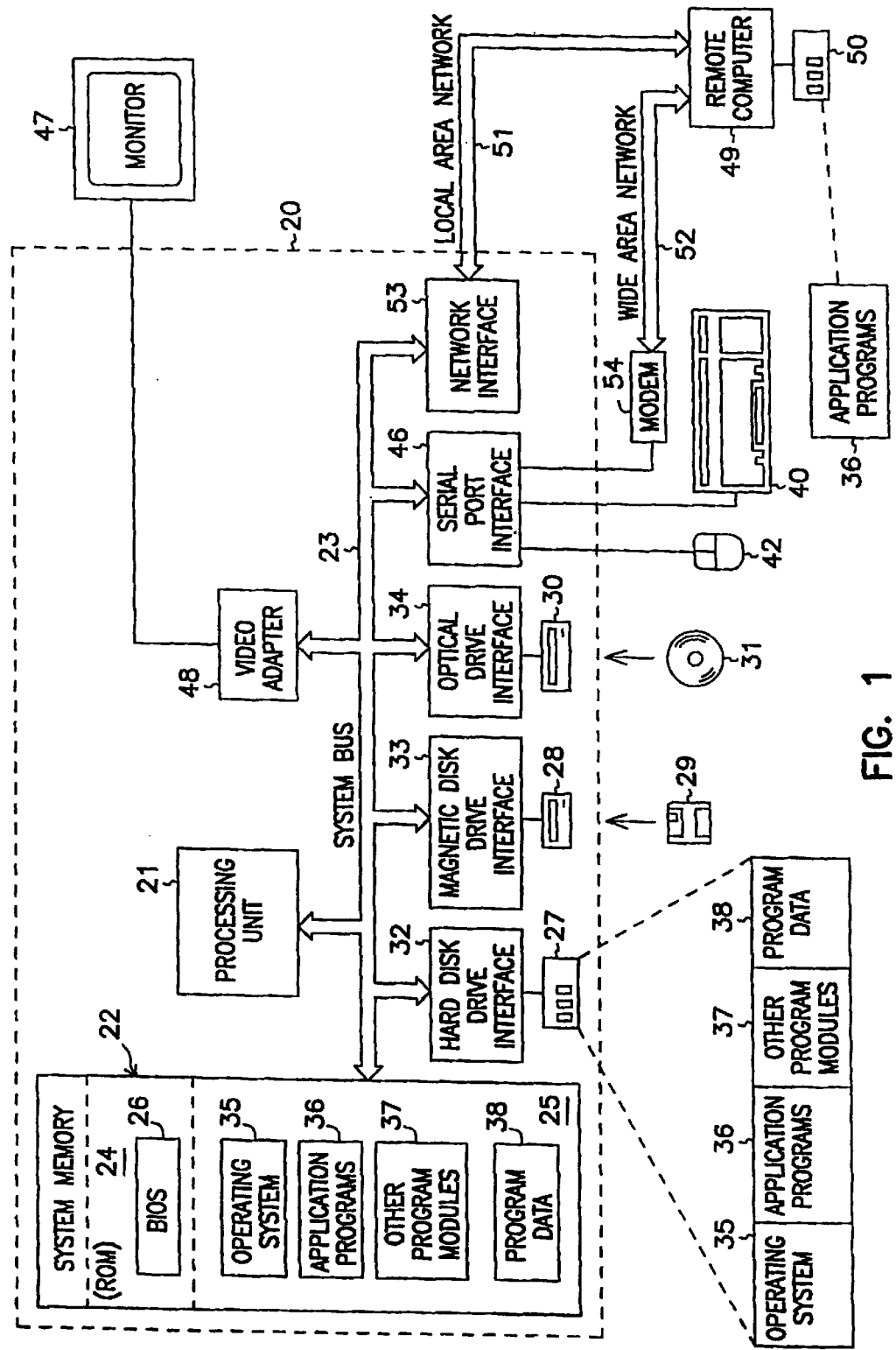
FIG. 1 is a block diagram of a hardware and operating environment of the present invention.

FIG. 1 provides a brief, general description of a suitable computing environment in which the invention may be implemented. The invention will hereinafter be described in the general context of computer-executable program modules containing instructions executed by a personal computer (PC): Program modules include routines, programs, objects, components, data structures, libraries, etc. that perform particular tasks or implement particular abstract data types. Those skilled in the art will appreciate that the invention may be practiced with other computer-system configurations, including hand-held devices, multiprocessor systems, microprocessor-based programmable consumer electronics, network PCs, minicomputers, desktop computers, engineering workstations, mainframe computers, and the like. The invention may also be practiced in distributed computing environments where tasks are performed by remote processing devices linked through a communications network. In a distributed computing environment, program modules may be located in both local and remote memory storage devices, and some functions may be provided by multiple systems working together.

FIG. 1 employs a general-purpose computing device in the form of a conventional personal computer 20, which includes processing unit 21, system memory 22, and system bus 23 that couples the system memory and other system components to processing unit 21. System bus 23 may be any of several types, including a memory bus or memory controller, a peripheral bus, and a local bus, and may use any of a variety of bus structures. System memory 22 includes read-only memory (ROM) 24 and random-access memory (RAM) 25. A basic input/output system (BIOS) 26, stored in ROM 24, contains the basic routines that transfer information between components of personal computer 20. BIOS 24 also contains start-up routines for the system. Personal computer 20 further includes hard disk drive 27 for reading from and writing to a hard disk (not shown), magnetic disk drive 28 for reading from and writing to a removable magnetic disk 29, and optical disk drive 30 for reading from and writing to a removable optical disk 31 such as a CD-ROM or other optical medium. Hard disk drive 27, magnetic disk drive 28, and optical disk drive 30 are connected to system bus 23 by a hard-disk drive interface 32, a magnetic-disk drive interface 33, and an optical-drive interface 34, respectively. The drives and their associated computer-readable media provide nonvolatile storage of computer-readable instructions, data structures, program modules and other data for personal computer 20. Although the exemplary environment described herein employs a hard disk, a removable magnetic disk 29 and a removable optical disk 31, those skilled in the art will appreciate that other types of computer-readable media which can store data accessible by a computer may also be used in the exemplary operating environment. Such media may include magnetic cassettes, flash-memory cards, digital versatile disks, Bernoulli cartridges, RAMs, ROMs, tape archive systems, RAID disk arrays, network-based stores and the like.

Program modules may be stored on the hard disk, magnetic disk 29, optical disk 31, ROM 24 and RAM 25. Program modules may include operating system 35, one or more application programs 36, other program modules 37, and program data 38. A user may enter commands and information into personal computer 20 through input devices such as a keyboard 40 and a pointing device 42. Other input devices (not shown) may include a microphone, joystick, game pad, satellite dish, scanner, or the like. These and other input devices are often connected to the processing unit 21 through a serial-port interface 46 coupled to system bus 23; but they may be connected through other interfaces not shown in FIG. 1, such as a parallel port, a game port, or a universal serial bus (USB). A monitor 47 or other display device also connects to system bus 23 via an interface such as a video adapter 48. A video camera or other video source is represented at 60 as being coupled to video adapter 48 for providing video images for video conferencing and other applications, which may be processed and further transmitted by personal computer 20. In further embodiments, a separate video card may be provided for accepting signals from multiple devices 60, including satellite broadcast encoded images. In addition to the monitor, personal computers typically include other peripheral output devices (not shown) such as speakers and printers.

Personal computer 20 may operate in a networked environment using logical connections to one or more remote computers such as remote computer 49. Remote computer 49 may be another personal computer, a server, a router, a network PC, a peer device, or other common network node. It typically includes many or all of the components described above in connection with personal computer 20; however, only a storage device 50 is illustrated in FIG. 1. The logical connections depicted in FIG. 1 include local area network (LAN) 51 and a wide-area network (WAN) 52. Such networking environments are commonplace in offices, enterprise-wide computer networks, intranets and the Internet.

When placed in a LAN networking environment, PC 20 connects to local network 51 through a network interface or adapter 53. When used in a WAN networking environment such as the Internet, PC 20 typically includes modem 54 or other means for establishing communications over network 52. Modem 54 may be internal or external to PC 20, and connects to system bus 23 via serial-port interface 46. In a networked environment, program modules, such as those comprising Microsoft® Word which are depicted as residing within 20 or portions thereof may be stored in remote storage device 50. Of course, the network connections shown are illustrative, and other means of establishing a communications link between the computers may be substituted.

Software may be designed using many different methods, including C, assembler, VisualBasic, scripting languages such as PERL or TCL, and object oriented programming methods. C++ and Java are two examples of common object oriented computer programming languages that provide functionality associated with object oriented programming.

An interface is a group of related functions that are organized into a named unit. Each interface may be uniquely identified by some identifier. Interfaces have no instantiation, that is, an interface is a definition only without the executable code needed to implement the methods which are specified by the interface. An object may support an interface by providing executable code for the methods specified by the interface. The executable code supplied by the object must comply with the definitions specified by the interface. The object may also provide additional methods. Those skilled in the art will recognize that interfaces are not limited to use in or by an object oriented programming environment.

Figure 2:
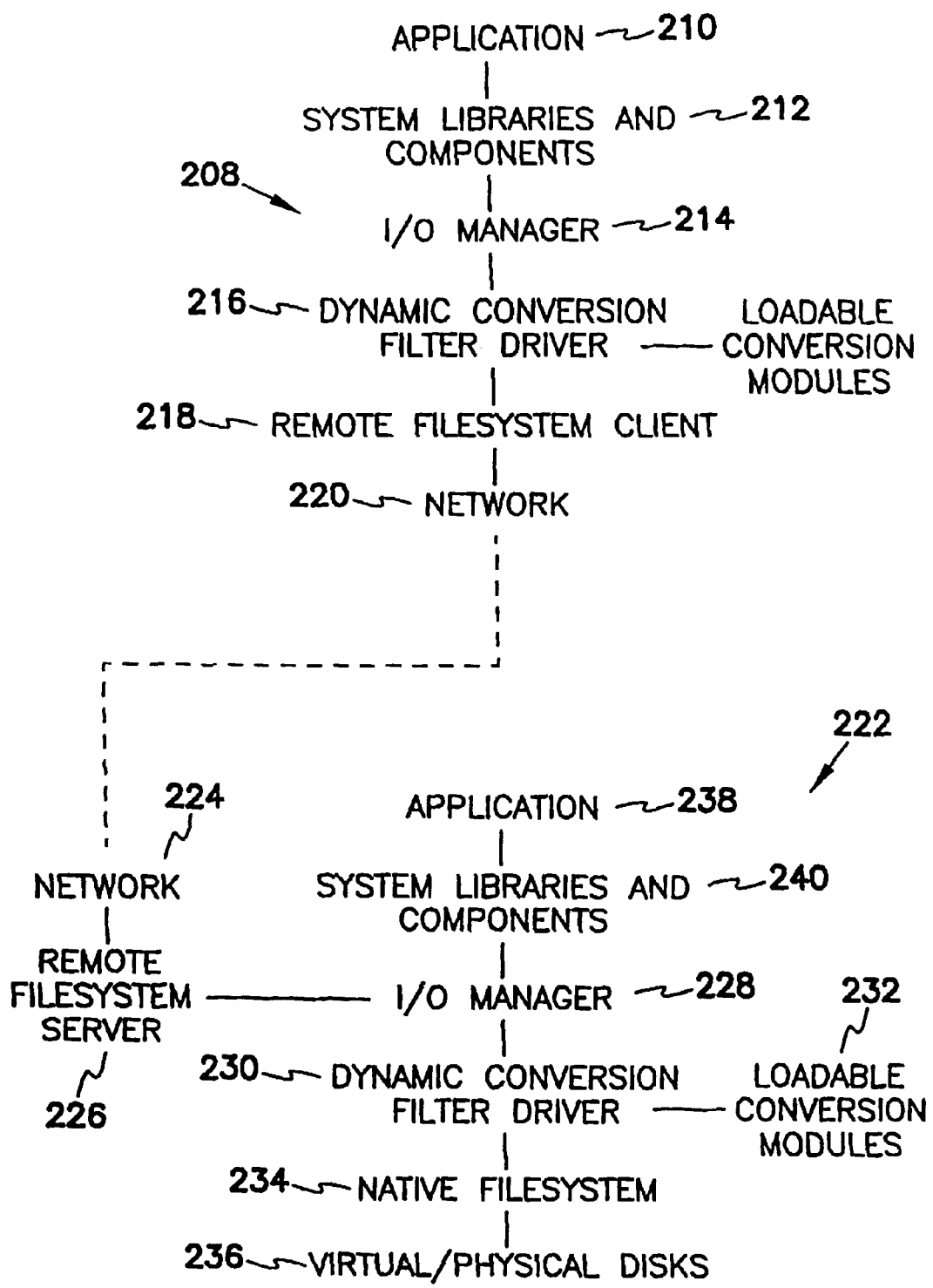
FIG. 2 is a high level block diagram showing the relationship between a filter driver of the present invention and other operating environment programs.

In FIG. 2, a client system 208 comprises an application such as Microsoft Word which utilizes several system libraries and components 212, and interfaces with an input/output (I/O) manager 214. The system libraries include OLE32 in one embodiment, which comprises a set of well known interfaces for providing multiple streams and other internal structure to a single information container stored by storage system or file system. The version of OLE32 in 212 is older, and uses a docfile format which stores information in a single stream of the unit container provided by the file system. A dynamic conversion filter driver 216 resides between the I/O manager 214 and a file system client 218 on an NTOS WindowsNT® kernel driver stack. The filter driver 216 provides conversion between different file or storage system formats to provide the application 210 and system libraries 212 with the ability to access information in the format that they know how to handle. Filter driver 216 will recognize the desired format, and provide a dynamic view of the information in that format. Even error codes are converted in case the application relies on such codes from the file system that it expects is handling and storing the data. The filter driver resides in the kernel of the operating system in one embodiment, and also has the ability to invoke loadable conversion modules for providing conversion of further application level and file system level formats. The loadable modules can be provided by the operation system. They can also be provided by applications so that data created in a new format can be made available to earlier versions of the application that expect a different format.

Application 210 can also access data through a network connection represented at 220. A server system 222 also comprises a network connection 224 coupled to a remote filesystem server 226 which is in turn interfaced to a server I/O manager 228. I/O manager 228 routes file interactions through a server conversion filter driver 230, which also has the ability to invoke loadable conversion modules 232. The filter driver 230 interfaces with a native file system 234 which stores data in a multi stream format on secondary storage 236. Secondary storage 236 comprises virtual or physical disks or other type of persistent storage. The native file system 234 is provided by Microsoft® WindowsNT® 5.0, and supports multiple formats for document files. Documents stored on the WindowsNT FAT file system can be stored in the docfile format. Documents stored on the NT file system (NTFS) can be stored in either docfile or a native structure storage (NSS). Docfile format is also available on previous Microsoft Windows® systems, but NSS format is available only on WindowsNT 5.0 or later. The NTFS file system stores data in a multi-stream format, with the different streams representing different types or formats of data in a document, such as text, graph and spreadsheet. Applications written with the NSS format, utilize the same set of interfaces which are used for docfiles, but the information is stored in the NSS format. When information stored in NSS format is transferred to other systems, or even to file systems on the same system which do not support the multi-streams of NTFS, there is a compatibility problem.

An application 238 residing on the server system 222 utilizes system libraries and components 240 and accesses data stored on the server through I/O manager 228 as well. The two filter drivers 216 and 230 can be stacked across the network, and the conversion modules within a particular system can also be stacked. Thus, if there is a conversion provided between formats A and B on the client side, and between B and C on the server side, they can be stacked to get conversion between A and C. It is generally best to avoid stacking conversions for performance reasons, but being able to access data at any speed is better than not being able to access it at all. If a single conversion between A and C is available on only one of the client and server, only one conversion need take place. It should be noted that a filter driver on the server side may be all that is required, as it can provide format conversions on the client's view of information prior to providing it to the client, and also can appropriately transform information provided by the client to the proper format for storage on the server.

In further embodiments, the conversion modules provide for conversion of data for different versions of a single application, such as between documents stored in a Word 7.0 format and a Word 8.0 format. Software to perform such conversions is well known in the art, and is highly dependent on the particular applications involved. Further conversion modules can provide data from different applications, such as other word processors, spreadsheets, or imaging programs which may have their own formats for storing data. One example of such a format is the tag based format of hypertext markup language (html). In this example, a word processor which is not tag based, may store a document in one format, and an html editor may request access to that document in html format. Upon receiving such a request to open the file containing the document, the filter driver may invoke a conversion module to perform dynamic conversion and provide an html view of the document to the html editor. Further conversion of the underlying storage format may also be required. These conversions can be transparent to the html editor such that it believes that it directly accessed an html file from the storage system. Upon completion of viewing or editing the document, the reverse conversions are performed, and the document is again stored in a non-html format in the original file system format.

Figure 3:
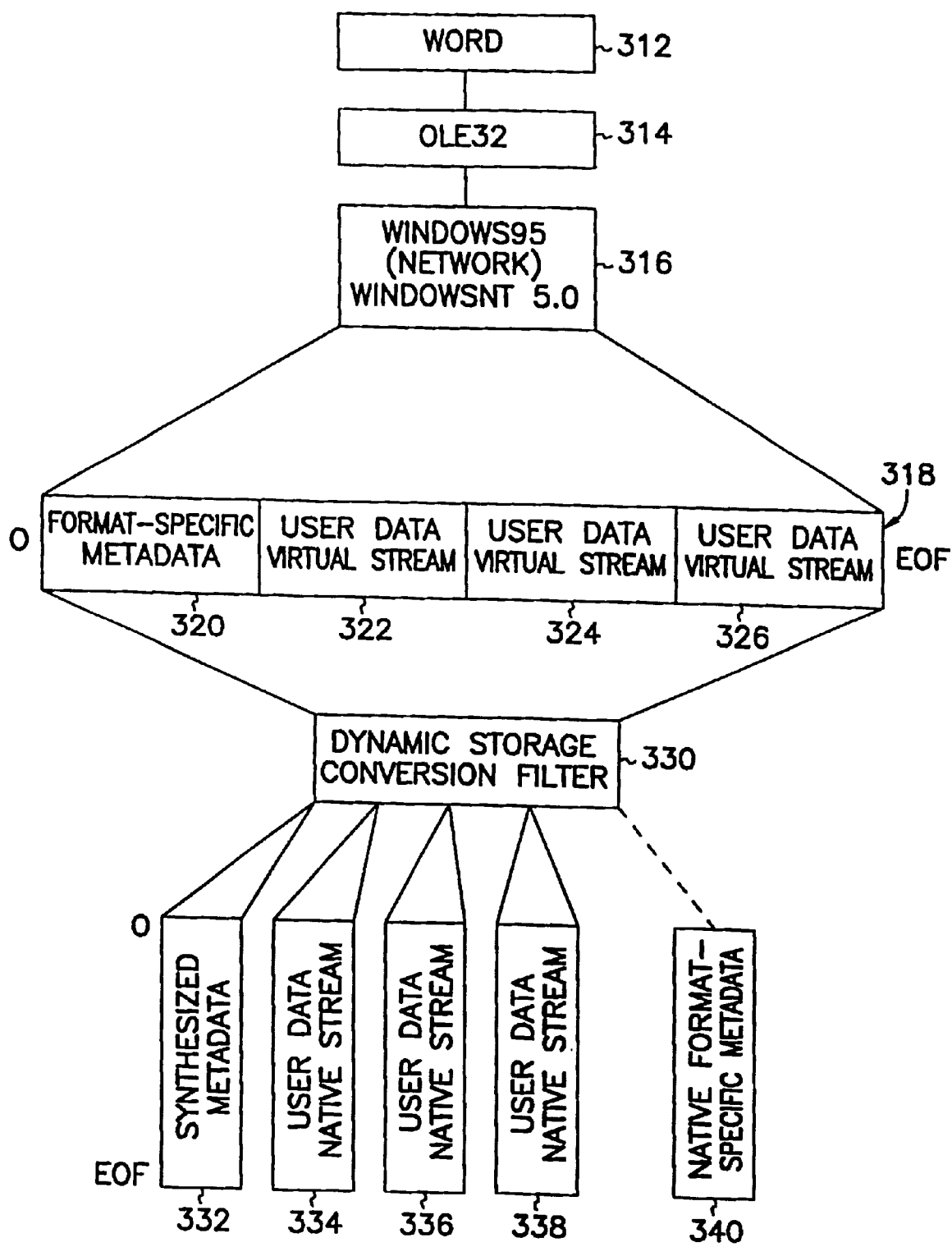
FIG. 3 is a block diagram of the conversion between NSS storage formats used in WindowsNT 5.0, and a docfile format expected by Windows95.

FIG. 3 illustrates the conversion at a data structure level. An application such as Microsoft® Word indicated at 312 utilizes OLE32 interfaces 314 to access data it thinks is stored in a Windows95® environment at 316. Block 316 indicates an expected file system such as those implemented in Windows95 where files are stored in a docfile format, and a network connection to a WindowsNT® 5.0 environment where files are stored in native structured storage (NSS) format which is only exposed through OLE32/Stg application program interfaces (APIs). The version of OLE32 at 314 expects to view the data it deals with as if it were stored in a single stream structure storage format (docfile) indicated at 318 consistent with Windows95. The single steam format comprises metadata 320, which includes items like file allocation tables (FAT) which identifies where segments of data, 322, 324 and 326 which are logically connected to comprise application data of file are located on disk. Metadata 320 also may include application specific information such as document profiles and formatting information that OLE32 314 uses, but is not normally seen by the application 312.

Although OLE32 314 expects the WORD document to be represented as a single-stream docfile, the OLE32 on the WindowsNT 5.0 system has previously stored the document using the new Native Structured Storage (NSS) format. The data shown in 320, 322, 324, and 326 are logical views of the data actually stored in 332, 334, 336 and 338.

A dynamic storage format conversion filter at 330 converts between the docfile format view expected by Windows 95/OLE32 and the multi stream structure NSS storage format used on WindowsNT 5.0 by default as represented in blocks 332, 334, 336, 338, 340 and 342. The native structured storage is represented by a block 332 of synthesized metadata, which comprises auxiliary information about the file to aid in quickly converting it to the format desired by the application. Pointers and hints about the conversion are kept in streams represented by block 332. It can also include audit trails of file access, such as the identity and time of access to a file, and also a record of changes to allow reconstruction of various temporal versions of the file. Further information can include work flow semantics to ensure that proper approvals are obtained prior to changing a document by a member of a group, or to otherwise manage work flow. The application data, or user data is stored in multiple streams as indicated at blocks 334, 336 and 338, while native format specific metadata is stored at block 340 and comprises a separate stream of associated attributes such as names of the files, and other well known information related to the NTFS file system.

The on-the-fly conversion allows non-WindowsNT 5.0 clients, such as older version applications, to read and write NSS files as if they were in docfile format, without severe performance penalty. It also allows NSS files to be concurrently accessed according to 'how-to' rules that satisfy both older docfile and newer NSS format requirements. Files in NSS format are not degraded to docfile format, unless absolutely necessary, such as when DOCVIEW is corrupted, or is being copied to a non-NTFS 5 volume.

The format of an information container includes more than the logical layout and semantics of the data. There may be auxiliary information that has implied semantics (ACLs, reparse points, property sets, auxiliary data streams, alternate representations, cached information, annotations, audit trails, workflow specifications, synthesized data). Some of the semantics can be far more complex than just what data to provide for a read operation. Different status codes may be returned depending on the history of operations by the current, as well as other concurrent, applications and the underlying state of the system and network. When information is returned, the information itself may be dependent on the histories in a formalized way. The filter driver must also maintain the format semantics relating to extraordinary events, such as system crashes. The details of all these semantic considerations are part of the file format, and are translated by the filter-driver when providing a view of information requiring dynamic information conversion.

When applications open files, or database records, or other persistent information containers, they specify the format version that they expect to see by means of a parameter to the API, a naming convention, or through a default expected-format rule, though the file may actually be stored in a different format. If the file's true format and the expected format are compatible, the filter driver allows access to the information. When the application reads, writes or otherwise accesses the file, the filter driver give the application a view of the file that appears to be in the expected format.

Besides the format of the data, the filter-driver also translates semantic information regarding concurrent access between applications expecting various formats, as well as maintaining auxiliary information and meta-data, used for managing information and for other purposes, such as crash recovery or performance tuning.

When a file of a particular format-type is created, the filter driver picks a default format based on the format specified by the client and the target storage system where the file will reside. The filter driver not only provides a client with the expected format through dynamic conversion, it may also convert the actual format that a file is stored in. If an application opens a file in one format, but then changes the format itself to an unknown format, the final format may be used by the filter driver to store the modified file in the file system.

Files moved between storage systems with different characteristics may need to be converted to different formats. Also, a filter driver may keep a file in different formats depending on its access history, optimizing for the most common access, or using a private internal format that isn't exposed to applications.

Figure 4:
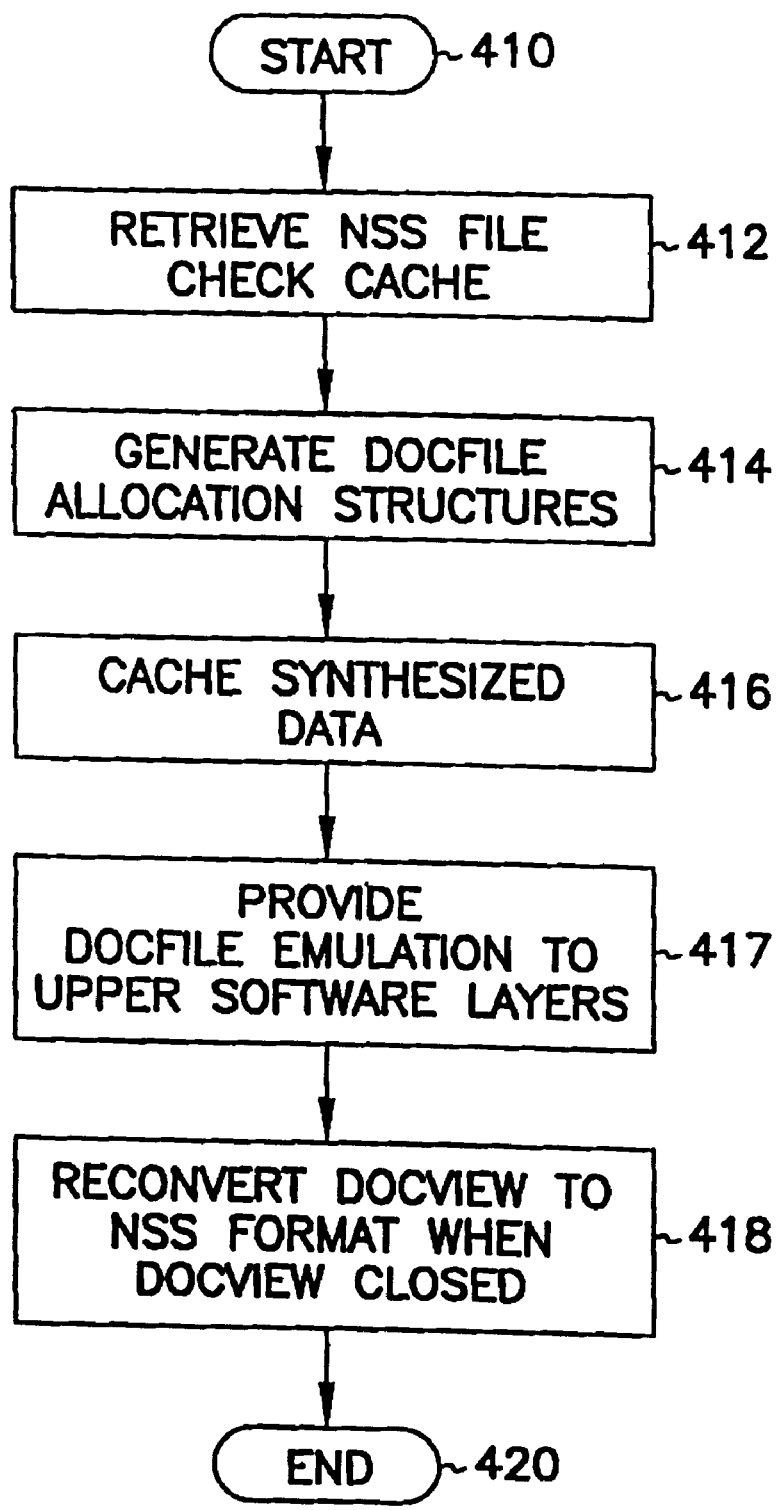
FIG. 4 is a flowchart of dynamic conversion between the NSS and docfile formats performed by the filter driver.

In one embodiment of the invention, the filter driver is used to provide dynamic conversion between the multistream NSS format file used by the OLE32 component in WindowsNT 5.0 and the single-stream docfile used by OLE32 in earlier systems. The internal structure of a docfile can be quite complex—due to the allocation/de-allocation of FAT sectors over time. NSS files leverage the implementation of multi-stream files in NTFS to remove the allocation structures (FAT, DIF (double indirect FAT), and mini-FAT). When the filter driver synthesizes the docfile format from an NSS file when an open is requested at 410 in FIG. 4, the NSS file is retrieved at 412, and a cache is checked to see if allocation structures already exist. If not, appropriate docfile allocation structures are generated at 414. However they can be given a clean structure using contiguous allocations, making the conversion from multi-stream format relatively easy to perform on-the-fly. The synthesis requires additional cycles on the server, but the synthesized data is cached at 416 between opens of docfile views. The stream that contains the synthesized docfile metadata is referred to as the conversion stream. The conversion stream, together with the NSS large streams and the ministream which reside in native NTFS streams, comprise the docfile view of the NSS file which is provided to the application at 417.

Dynamic conversion maps docfile view read/write requests into accesses on the underlying NTFS streams 417. The key differences between the docfile and NSS formats are that the docfile FAT and DIF are missing from the NSS format. The allocation metadata for each large stream is maintained internally by NTFS. The header and the directory stream have different representations. The NSS ministream uses contiguous allocation of small steams, eliminating the need for the docfile mini-FAT.

When a docfile view is extended, additional storage is allocated at the end of the conversion stream. If a docfile view is modified, the changes show up in the underlying streams. When the final docfile view is closed, the filter driver reconverts the internal conversion format that supports the docfile view into NSS format at 418 and ends at 420. Reconversion is performed carefully so that it can be recovered by the filter driver the next time the file is opened, if the system crashes while reconversion is being performed.

After a docfile view is opened, until reconversion is complete, the native NSS view of the storage format of the file is unavailable. If a concurrent NSSVIEW open is attempted, it fails—and OLE32/STG will reopen for a docfile view. If there is already an NSS view open when a docfile view is opened, the filter driver follows the NSS/docfile commit protocol to obtain a consistent view of the NSS file. The filter driver then performs a full conversion by copying all the NSS stream into the conversion stream after the synthesized docfile metadata. Every subsequent docfile view open performs another full conversion until all views of the file have been closed. Each full conversion will overwrite the previous conversion stream. The commit protocol keeps existing docfile view opens from trying to take a snapshot of the docfile view while a new docfile view open does full conversion.

Local opens of NSS files normally use an NSS view of the file, while network opens require a docfile view. For the most part, the operations on an NSS view are just passed down the driver stack. Operations on a docfile view are mapped into operations on the underlying streams using the conversion map, which specifies which parts of the docfile view live in the conversion stream and which parts live in the native NSS streams (i.e. the ministream and the large streams). This mode of operation is called partial conversion.

When there are both NSS views and docfile views on the same file, interoperation is complicated. In the general case, commits can occur from either type of view. A commit from an NSS view can be propagated to a docfile view simply by regenerating the conversion map and conversion stream. But a commit from a docfile view is much more expensive. The FAT/DIF, mini-FAT and other docfile metadata have to be analyzed. This is the same operation performed when the last docfile view is closed (reconversion), but is too expensive to perform at every commit of a docfile view.

To avoid the overhead of frequent reconversion if an NSS view exists, the filter driver creates a complete copy of the docfile view in the conversion stream, rather than just the docfile metadata 332. This mode is called full conversion. Although the binary data in the format is fully converted in this case, the 'how-to' semantics continue to be implemented by the filter driver. Achieving the desired behavior requires the cooperation of the OLE/NSS implementation. If a docfile view is already open, the filter driver fails any NSS view opens and OLE32 in WindowsNT 5.0 retries requesting a docfile view.

The full conversion docfile view is updated every time a new docfile view open occurs, if needed. The full conversion is also updated at the end of every NSS view commit.

The NSS format introduces a new transaction implementation for structured storage. Changes are recorded in a transaction log in a scratch stream. A concurrent docfile view open has to apply the changes specified in the log in order to see the correct NSS file. If the system or application crashed, then there will not be an NSS view when the log is processed by the filter driver, and the scratch stream will be deleted (and a ScratchID in an NSS header reset to invalid).

In NT5, reparse points are used to mark NSS files so that NSS doesn't have to read the header of every file opened on the volume. The directory steam is marked sparse so its length can be set to the length of the corresponding docfile view without using twice the disk allocation. Both of these designs are regarded as implementation details particular to NT5.

In the NT embodiment, the filter driver is implemented as a file system filter driver within the NT kernel, called CNSS (convert-NSS). The following changes to NTFS and NT I/O in NT5 support CNSS/NSS. Two new create/open option bit combinations called FILE_STRUCTURED_STORAGE and FILE_COPY_STRUCTURED_STORAGE have been added to the NTCreate/NtOpenFile APIs. NTFS files can be marked as being reparse points. An open to a file with a reparse point fails with STATUS_REPARSE and returns a 32b tag which the filter driver uses to identify NSS files. Individual streams of an NSS file can be marked SPARSE and extended to an arbitrary size without taking up disk space. CNSS uses this feature to make the size of the unnamed data stream of an NSS view appear to be the same as the docfile view size. Support is also provided for associating file system filter driver context with open files. Other operating systems may require different modifications as will be apparent during normal implementation of the concepts of the invention.

Figure 5:
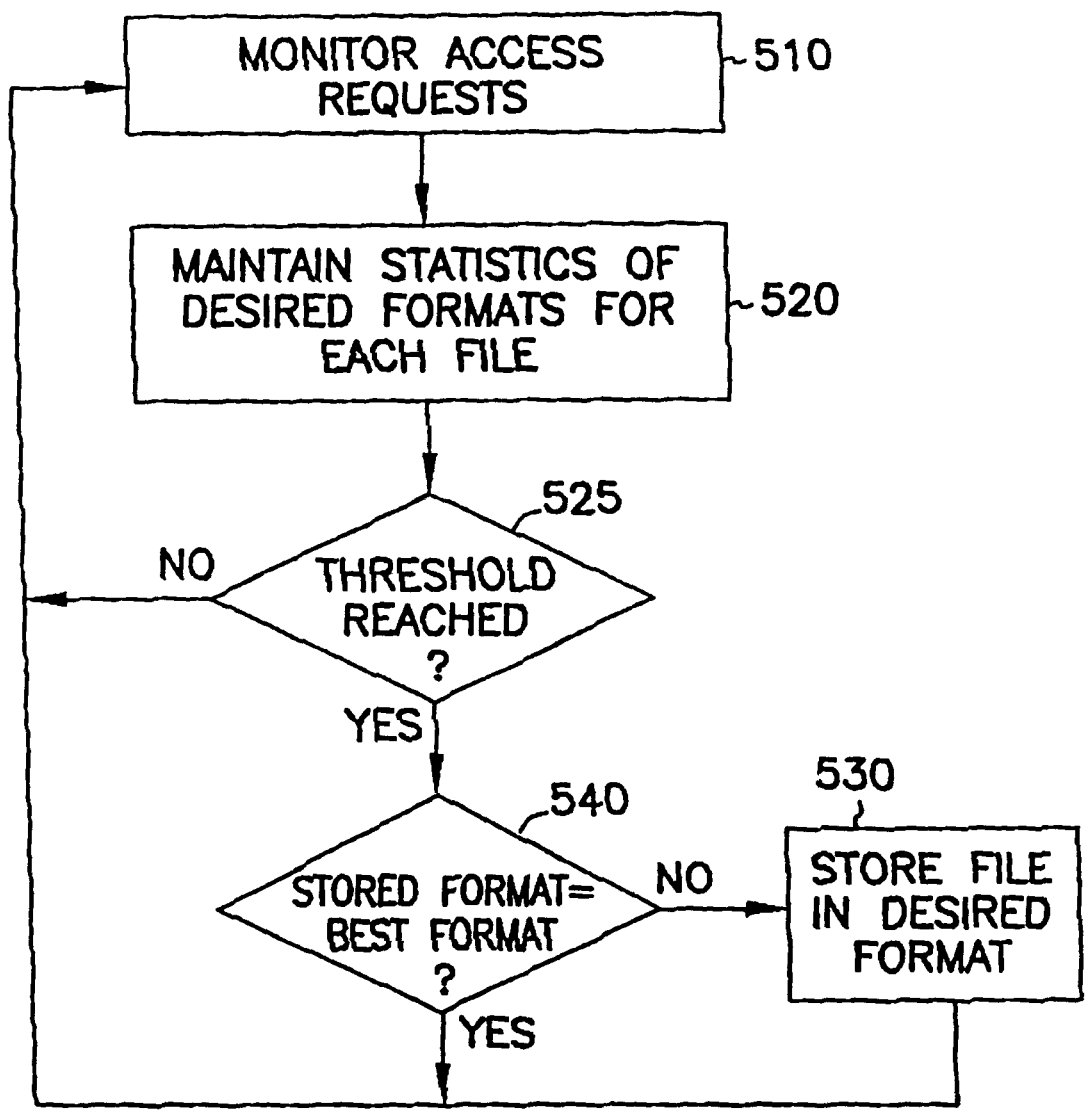
FIG. 5 is a flowchart of filter driver functions involved in tracking access and selecting formats for storage.

In FIG. 5, a process in the filter driver for changing the format in which files are stored is depicted. At 510, file requests are monitored, and statistics are generated at 520 regarding the various formats the file is requested in. If the access pattern reaches a threshold 525, the format that the file is stored in may dynamically be altered to be a different format 530 for reasons of tuning efficiency. If the file is already stored in the most efficient format as indicated at 540, monitoring continues at 510. The file may be stored in a different format if that format is determined to be more efficient, or easier to convert from for the various formats that the file is most commonly accessed in. Efficiency is determined by augmenting the stored file format to include history information about the formats and types of accesses of the file. This information is used to predict the amount of overhead required by dynamic conversion from candidate storage formats. The overhead includes a number of different factors including cpu cycles, memory usage, and access latency. If the overhead for accessing a file is predicted to significantly lower (10–20%) if the storage format is different, the file is marked to be statically converted. Static conversion to a new format is performed during periods when the system resources are underutilized, such as evenings or weekends.

Conclusion

A conversion component referred to as a filter driver provides a view of information stored in one format through dynamic conversion to a requested format. The formats comprise application specific formats, as well as particular persistent store formats used by components of the system such as a file system or a database. While the embodiments described relate to the conversion between NSS and docfile formats, it is recognized that many other conversions can be performed, including dynamic conversions of application specific formats such as those required by different versions of a single or multiple applications. The invention may be used to simplify the upgrade of information formats, application versions, and operating systems. These conversions can be provided by the conversion component of other dynamically loadable conversion modules, which allow format conversions to be provided by both operating systems and applications. The conversion modules run in the kernel below the I/O manager. Both networked and local accesses are routed through the conversion component and conversion is performed if needed, providing a general solution to the problem of format incompatibilities between different applications and operating systems and/or versions. Cached data aids in the conversion in one embodiment. A reparse point is used to indicate that a file should be converted in one version of the invention, but other types of indication, such as flags or table based mechanisms may also be used. This application is intended to cover any adaptations or variations of the present invention. It is manifestly intended that this invention be limited only by the claims and equivalents thereof.

We claim:

1. A method of storing information in a desired format type that a program can handle, the method comprising:

monitoring requests from programs to access information by desired format type;

determining frequency of such access by desired format type; and storing the information in a desired format type based on such frequency.

2. The method of claim 1, further comprising:

comparing the frequency of such access with a threshold frequency; and storing the information in a format type based on such frequency as compared to the threshold frequency.

3. The method of claim 1, wherein the act of storing comprises:

calculating resource metrics for the information in a current format type;

selecting a candidate format type based on the determined frequency;

calculating resource metrics for the information in the candidate format type;

comparing the resource metrics for the information in the current format type with the resource metrics for the information in the candidate format type; and storing the information in the candidate format type based on the comparison.

4. The method of claim 1, further comprising:

choosing one or more candidate format types from the frequency determination;

predicting an overhead prediction for computing resources required for dynamic conversion of the information to each of the candidate format types chosen;

comparing each overhead to select a desired format type;

calculating an amount overhead required to translate the information into the desired format type; and storing the information in the desired format type based on the calculation.

5. A machine readable medium having instructions stored thereon for causing a computer to perform a method of storing files in a desired format, the method comprising:

monitoring requests from programs to access a file in a desired format, each request desiring a format in which to access the file;

generating statistics relating desired formats to the number of accesses to the file per desired format type; and storing the file in a desired format which is selected based on such statistics.

6. The machine readable medium of claim 4, wherein the method of file storing further comprises:

evaluating the generated statistics against a statistical threshold; and storing the file in a format which is selected based on the generated statistics if the threshold is reached.

7. The machine readable medium of claim 4, wherein the act of generating statistics comprises:

estimating a resource cost of dynamic conversion of the file in a current format to a new format;

estimating a resource cost of file translation of the file in the current format to the new format; and comparing the resource cost of dynamic conversion of the file to the new format with the resource cost of file translation of the file to the new format.

8. The machine readable medium of claim 4, wherein the act of generating statistics comprises:

selecting a plurality of candidate storage formats based on the monitored requests;

predicting an overhead prediction for an amount of overhead required by dynamic conversion of the information to each of the candidate storage formats selected; and comparing the overhead predictions to select a desired format.

* * * * *

UNITED STATES PATENT AND TRADEMARK OFFICE
CERTIFICATE OF CORRECTION

PATENT NO. : 6,745,176 B2  
DATED : June 1, 2004  
INVENTOR(S) : Probert, Jr. et al.

It is certified that error appears in the above-identified patent and that said Letters Patent is hereby corrected as shown below:

<u>Title page,</u>  
Item [56], References Cited, U.S. PATENT DOCUMENTS, please add the following references:

| | | | | |
|---|---|---|---|---|
| -- 5,287,504 A | * | 2/1994 | Carpenter et al. | 707/201 |
| 2002/0078202 A1 | * | 6/2002 | Ando et al. | 707/225 |
| 2003/0023774 A1 | * | 1/2003 | Gladstone et al. | 709/328 |
| 2001/0025311 A1 | * | 9/2001 | Arai et al. | 709/225 -- |

<u>Column 2,</u>  
Line 61, delete "a"

<u>Column 11,</u>  
Line 3, delete "steams" and insert -- streams --

<u>Column 12,</u>  
Line 8, delete "steams" and insert -- streams --

Signed and Sealed this

Fourteenth Day of September, 2004

JON W. DUDAS  
*Director of the United States Patent and Trademark Office*